United States Patent
Chiu et al.

(10) Patent No.: US 11,472,073 B2
(45) Date of Patent: Oct. 18, 2022

(54) MICROWAVE-TRANSMITTING MOULD STRUCTURE AND METHOD FOR USING THE SAME

(71) Applicant: SUNKO INK CO., LTD., Taichung (CN)

(72) Inventors: Hui-Chen Chiu, Taichung (CN); Ting-Ti Huang, Taichung (CN); Ya-Chi Wang, Taichung (CN)

(73) Assignee: SUNKO INK CO., LTD., Taichung (CN)

( * ) Notice: Subject to any disclaimer, the term of this patent is extended or adjusted under 35 U.S.C. 154(b) by 243 days.

(21) Appl. No.: 16/635,557

(22) PCT Filed: Apr. 11, 2018

(86) PCT No.: PCT/CN2018/082662
§ 371 (c)(1),
(2) Date: Jan. 31, 2020

(87) PCT Pub. No.: WO2019/196029
PCT Pub. Date: Oct. 17, 2019

(65) Prior Publication Data
US 2021/0016475 A1   Jan. 21, 2021

(51) Int. Cl.
*B29C 44/34* (2006.01)
*B29C 33/38* (2006.01)
(Continued)

(52) U.S. Cl.
CPC .......... *B29C 44/3415* (2013.01); *B29C 33/38* (2013.01); *B29C 44/581* (2013.01); *B29K 2105/04* (2013.01); *B29L 2031/504* (2013.01)

(58) Field of Classification Search
CPC ... B29C 44/3415; B29C 33/38; B29C 44/581; B29C 33/06; B29C 33/202; B29C 33/303; B29C 2045/688; B29C 2045/686; B29C 2045/685; B29C 45/683; B29C 45/681; B29C 45/64; F16B 5/0052; F16B 5/065;
(Continued)

(56) References Cited

U.S. PATENT DOCUMENTS

2004/0226648 A1* 11/2004 Gupte ................. B29C 65/1483
156/275.7

FOREIGN PATENT DOCUMENTS

CN    101618580 A  *  1/2010  ........... B29C 33/202
CN    107187092 A  *  9/2017

\* cited by examiner

*Primary Examiner* — Jacob T Minskey
*Assistant Examiner* — S. Behrooz Ghorishi
(74) *Attorney, Agent, or Firm* — Bruce Stone LLP; Joseph A. Bruce

(57) ABSTRACT

Disclosed is a microwave-transmitting mould structure, comprising a first template, a second template and a mould combining unit. The mould combining unit has a first snap fit, a second snap fit and an engagement member. The first snap fit is arranged on the first template; the second snap fit is arranged on the second template; and the engagement member is snap-fit engaged between the first snap fit and the second snap fit, so that when the first template and the second template are subjected to an outward pressure, corresponding faces thereof which the engagement member can pass through respectively abut against abutting faces of the first snap fit and of the second snap fit, and thus, the first template and the second template cannot be separated from each other due to an increased pressure inside the mould.

6 Claims, 8 Drawing Sheets

(51) Int. Cl.
*B29C 44/58* (2006.01)
*B29K 105/04* (2006.01)
*B29L 31/50* (2006.01)

(58) Field of Classification Search
CPC .. F16B 5/0657; F16B 5/0664; B29K 2105/04; B29L 2031/504; B29D 35/122
See application file for complete search history.

MICROWAVE-TRANSMITTING MOULD STRUCTURE AND METHOD FOR USING THE SAME

BACKGROUND

Field of the Invention

The present invention relates to a mould suitable for microwave energy and for manufacturing shoe parts, and more particularly to a microwave-transmitting mould structure. The invention further relates to a method of using the aforementioned microwave-transmitting mould structure.

Related Prior Art

Generally, the shoe parts, such as the midsole or the outsole, can be bonded together by an adhesive. The conventional method is to raise the temperature of the shoe parts by means of an oven or the like so that the adhesive can obtain a sufficient temperature. However, the conventional heat source has the disadvantages of low efficiency and so on.

Therefore, the industry has adopted the practice of microwave heating, however, the shoe parts to be processed are made of foamed materials, such as EVA (polyvinyl acetate), etc. Formed materials will be inflated after being heated by microwaves, so that the pressure inside the mould is greatly increased. Therefore, if the microwaves directly penetrate the mould to heat the shoe parts, the pressure inside the mould will be large enough to open the mould, resulting in many follow-up problems.

To this end, a shoe part manufacturing mould suitable for microwave energy was invented in the industry. As shown in FIGS. 1 and 2, the mould 90 is made of a material that cannot be penetrated by microwaves, and a cavity 91 is formed at the center of the mould 90 for accommodating a to-be-processed shoe part. The outer surface of the mould 90 has a window 92 for allowing microwaves to pass through, and the window 92 communicates with the cavity 91, so that the microwave energy can only pass through the window 92 to enter the cavity 91 and is reflected within the cavity 91 to achieve the effect of heating.

However, the conventional shoe manufacturing mould only allows the microwave energy to enter the cavity 91 through the window 92, so that the shoe part cannot receive the microwave energy uniformly, thereby causing the shortcomings of inconspicuous processing effect, unevenness heating and etc. To this end, there is a need for a mould structure that allows for penetration of microwaves.

The present invention has arisen to mitigate and/or obviate the afore-described disadvantages.

SUMMARY

One objective of the present invention is to provide a microwave-transmitting mould structure which is capable of heating the shoe parts evenly during the heating process and improving the yield of the finished product.

Another objective of the present invention is to enable the mould to be stably closed during manufacturing process without being separated by the internal pressure of the mould.

To achieve the above objectives, a microwave-transmitting mould structure in accordance with the present invention comprises:

a first template made of a microwave-transmitting material;

a second template combined with the first template and made of a microwave-transmitting material;

a mould combining unit including a first snap fit, a second snap fit, and an engagement member, wherein the first snap fit is disposed on the first template, the second snap fit is disposed on the second template, the engagement member is disposed between the first snap fit and the second snap fit, the first snap fit and the second snap fit each have an abutting face, two ends of the engagement member each have a corresponding face, and the corresponding faces are abutted against the abutting faces.

Preferably, the first snap fit and the second snap fit respectively have a sliding groove, the abutting faces face the sliding grooves, the engagement member includes two engagement portions and a body portion, the two engagement portions are connected to two ends of the body portion, and each include one said corresponding face, the engagement portion at one end of the engagement member is engaged in the sliding groove of the first snap fit, and the engagement portion at another end of the engagement member is engaged in the sliding groove of the second snap fit.

A method for using the microwave-transmitting mould structure provided by the present invention comprises:

a step of inserting a foaming material including placing the foaming material into the first shoe body manufacturing portion or the second shoe body manufacturing portion;

a step of closing mould including closing the first template and the second template, applying a pressure to the first template and the second template to compress the foaming material inside the first template and the second template;

a step of locking including placing the engagement member between the first snap fit and the second snap fit, and the corresponding faces at two ends of the engagement member are abutted against the abutting faces of the first snap fit and the second snap fit, respectively; and a step of microwaving including placing the first template and the second template in a microwave device, so that microwave energy directly penetrates the first template and the second template to the foaming material.

It can be learned from the above that the first template and the second template are respectively provided with the first snap fit and the second snap fit, and then the engagement member is engaged in the sliding grooves of the first snap fit and the second snap fit, so that, when the first template and the second template are subjected to the outward pressure, by the corresponding faces of the engagement member respectively abutting against the abutting faces of the first snap fit and the second snap fit, the first template and the second template are able to abut against each other without being separated due to an increase in pressure inside the mould.

In addition, the first template and the second template of the present invention are all made of a microwave-transmitting material, so that in the presence the microwave irradiation, the shoe parts can receive the energy of the microwave more evenly, so that the shoe parts can be heated more uniformly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
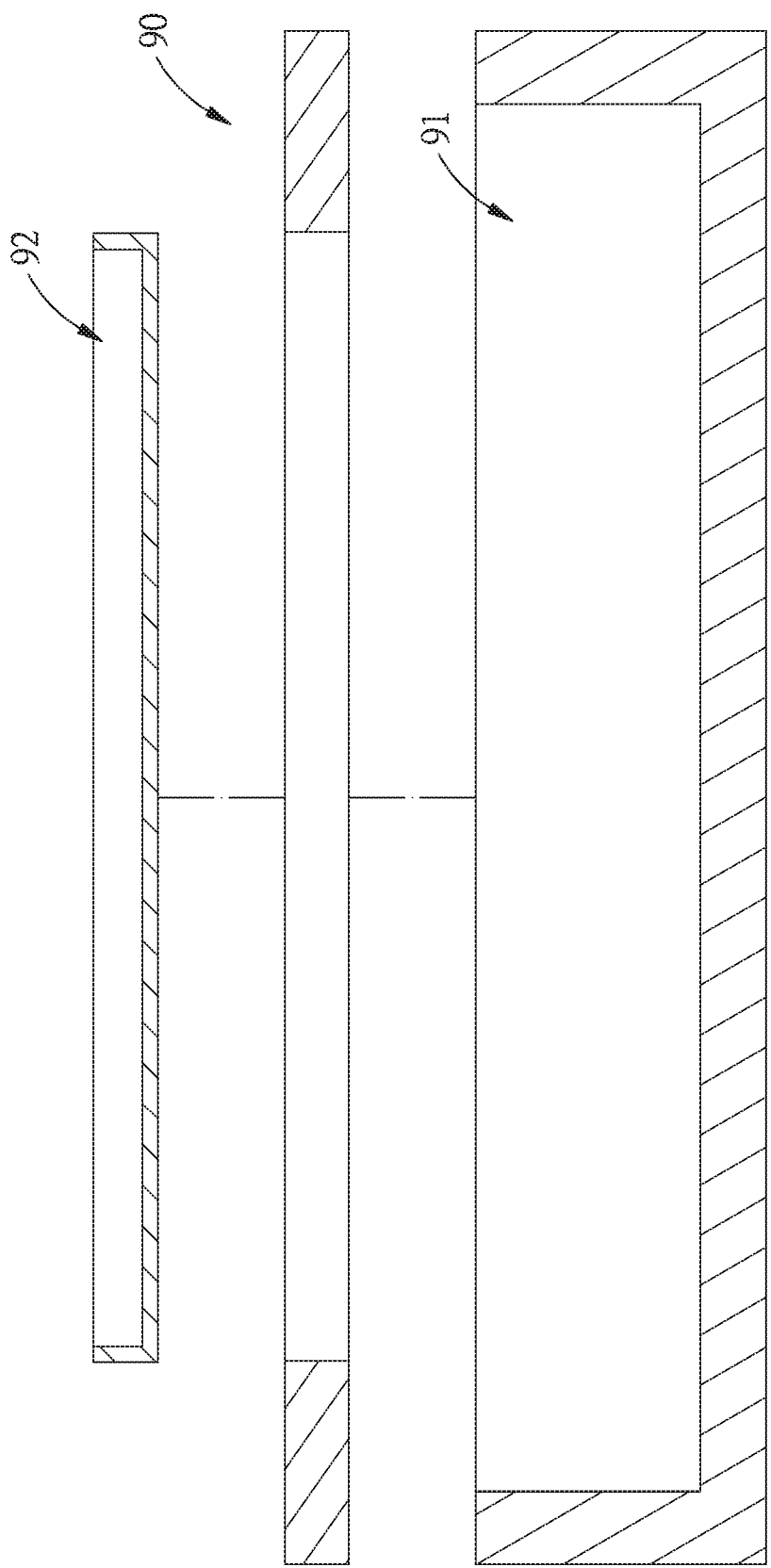
FIG. 1 is a schematic exploded view of a conventional footwear manufacturing mould suitable for microwave energy.
Figure 2:
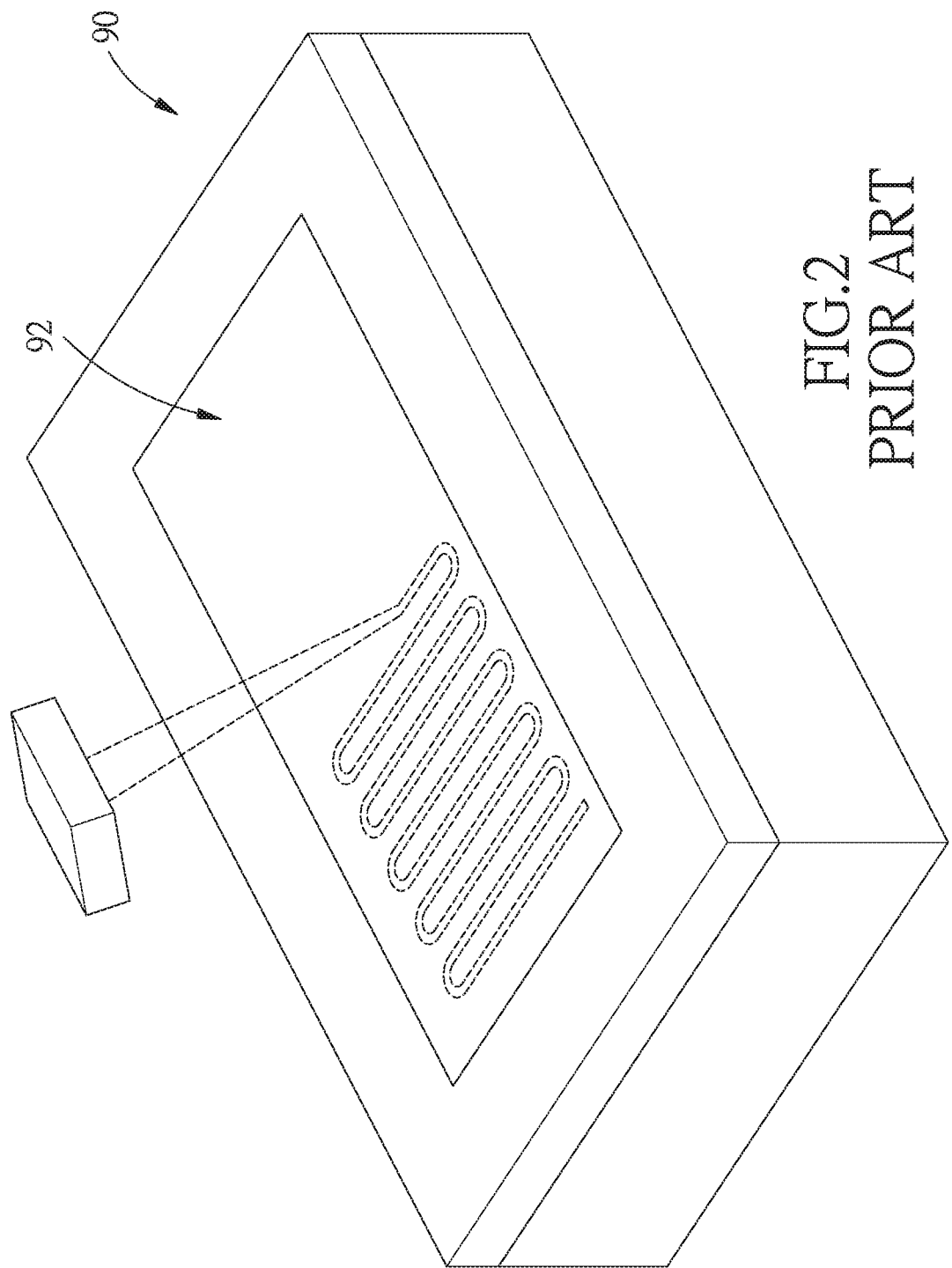
FIG. 2 is a schematic diagram of a microwave irradiation window of a conventional footwear manufacturing mould suitable for microwave energy.
Figure 3:
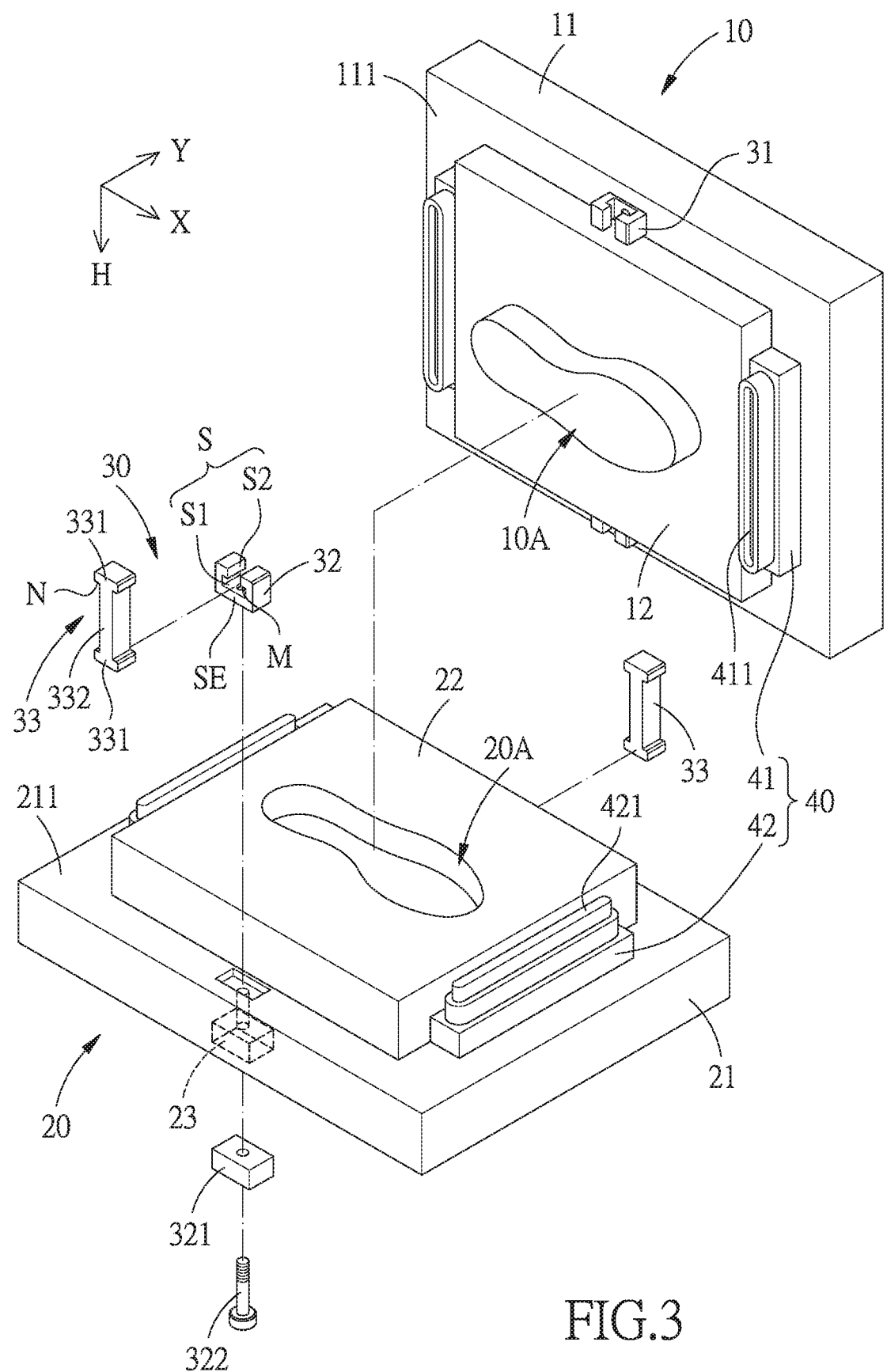
FIG. 3 is an exploded view of a microwave-transmitting mould structure according to the present invention.
Figure 4:
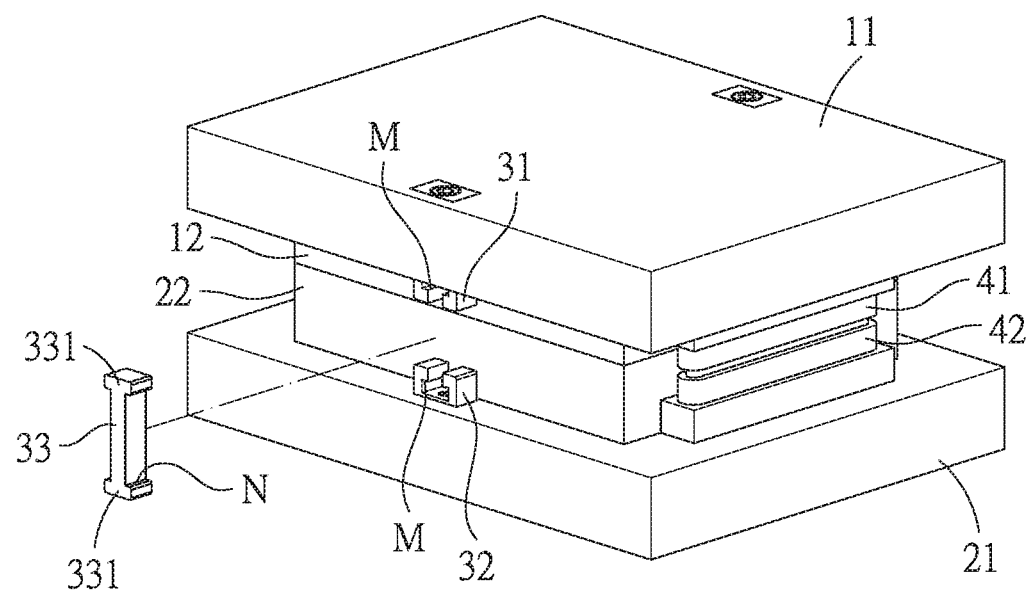
FIG. 4 is a partial exploded view of the microwave-transmitting mould structure according to the present invention.

The technical solutions of the present invention will be clearly and completely described below. It is obvious that the described embodiments are a part of the embodiments of the present invention, and not all of them. All other embodiments obtained by a person of ordinary skill in the art based on the embodiments of the present invention without creative efforts are within the scope of the present invention.

Referring to FIGS. 3-10, a microwave-transmitting mould structure in accordance with the present invention comprises: a first template 10, a second template 20, and a mould combining unit 30.

The first template 10 has a first shoe body manufacturing portion 10A formed on one surface thereof, and is made of a microwave-transmitting material, such as polypropylene, polyvinyl chloride, polyethylene terephthalate, polytetrafluoroethylene, quartz, liquid silicone rubber, glass epoxy resin laminate, etc., in this embodiment, the first shoe body manufacturing part 10A is a male mould.

The second template 20 is combined with the first template 10, has a second shoe body manufacturing portion 20A formed on a surface thereof facing the first template 10, and is made of a microwave-transmitting material, such as polypropylene, polyvinyl chloride, polyethylene terephthalate, polytetrafluoroethylene, quartz, liquid silicone rubber, glass epoxy resin laminate, etc., in this embodiment, the second shoe body manufacturing portion 20A is a female mould.

The mould combining unit 30 includes a first snap fit 31, a second snap fit 32, and an engagement member 33. The first snap fit 31 is disposed on the first template 10, and the second snap fit 32 is disposed on the second template 20. The first snap fit 31 and the second snap fit 32 respectively have an abutting face M. Two ends of the engagement member 33 respectively have a corresponding face N, the engagement member 33 is disposed between the first snap fit 31 and the second snap fit 32, and the corresponding faces N are abutted against the abutting faces M.

Figure 5:
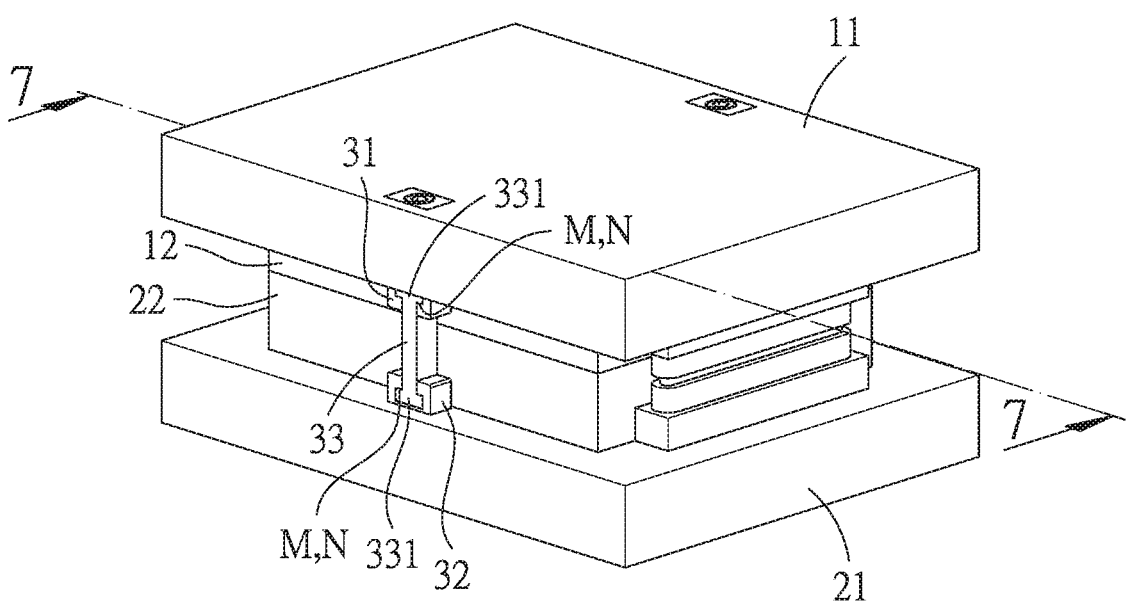
FIG. 5 is an assembly perspective view of the microwave-transmitting mould structure according to the present invention.
Figure 6:
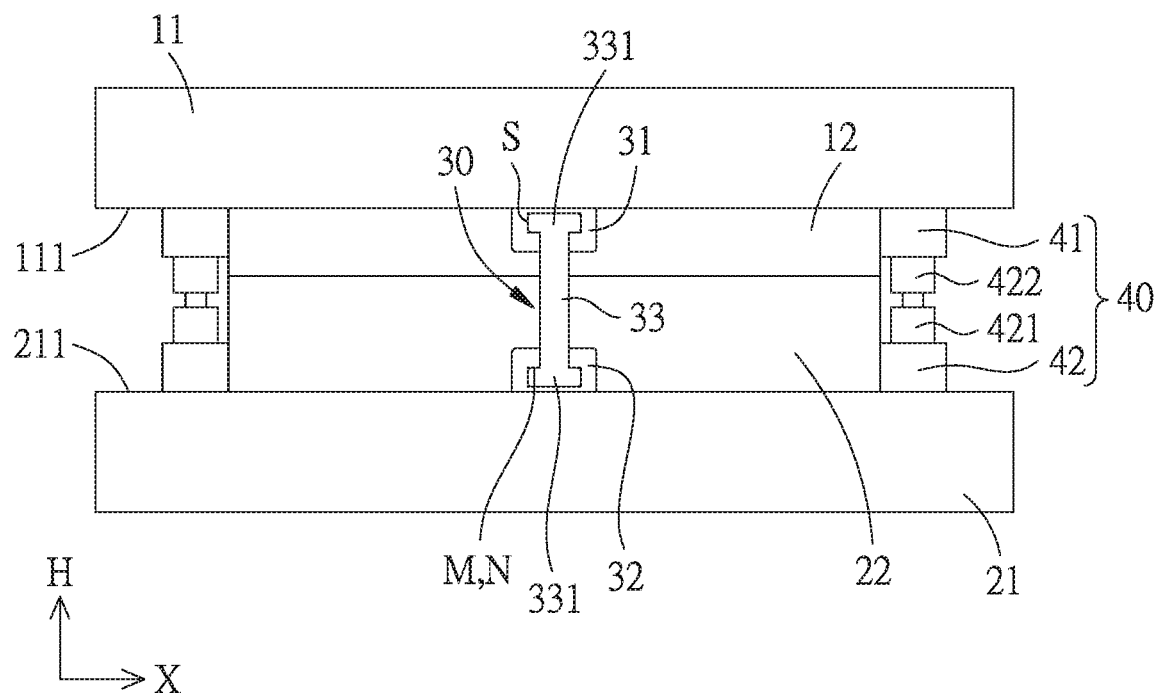
FIG. 6 is an assembly side view of the microwave-transmitting mould structure according to the present invention.
Figure 7:
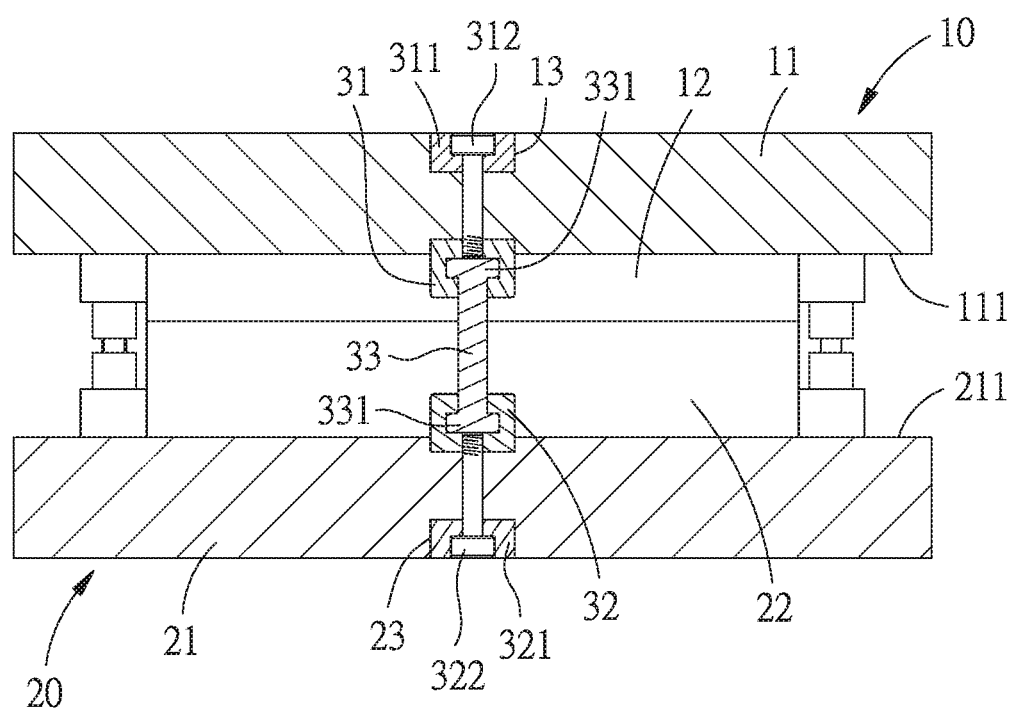
FIG. 7 is a cross-sectional view of the microwave-transmitting mould structure according to the present invention.

In the embodiment, the first snap fit 31 and the second snap fit 32 respectively have a sliding groove S. Two opposite ends of the sliding groove S each have an open end SE in an open form, an extending direction between the two open ends SE is a horizontal direction Y, the sliding groove S has a first groove portion S1 and a second groove portion S2, a direction extending from the first groove portion S1 to the second groove portion S2 is a height direction H which is perpendicular to the horizontal direction Y, and a longitudinal direction X is perpendicular to the horizontal direction Y and the height direction H. The diameter of the first groove portion S1 along the longitudinal direction X is larger than the diameter of the second groove portion S2 along the longitudinal direction X, and the abutting face M faces the first groove portion S1. The second groove portion S2 is closer to another snap fit 31, 32 than the first groove portion S1, when the first template 10 covers the second template 20, as shown in FIGS. 5-7. The engagement member 33 includes two engagement portions 331 and a body portion 332. The two engagement portions 331 are connected to two ends of the body portion 332, and each include a corresponding face N. The diameter of each of the engagement portions 331 is equal to that of the first groove portion S1, and a diameter of the body portion 332 is equal to that of the second groove portion S2. The engagement portion 331 at one end of the engagement member 33 is engaged in the first groove portion S1 of the first snap fit 31, the engagement portion 331 at another end of the engagement member 33 is engaged in the first groove portion S1 of the second snap fit 32, and the corresponding faces N are abutted against the abutting faces M, so that the engagement member 33 can only be taken out from the first snap fit 31 and the second snap fit 32 along the horizontal direction Y.

Another embodiment further includes at least one positioning assembly 40 having a first positioning member 41 and a second positioning member 42. The first positioning member 41 is mounted on a surface of the first template 10 facing the second template 20, the second positioning member 42 is disposed on a surface of the second template 20 facing the first template 10, and the first positioning member 41 is configured to be connected to the second positioning member 42. In this embodiment, the first positioning member 41 has at least one concave portion 411, the second positioning member 42 has at least one convex portion 421, and the convex portion 421 is inserted into the concave portion 411, so that the first positioning member 41 and the second positioning member 42 are jointed together in a concave and convex manner.

In a preferred embodiment, the first template 10 has a first outer mould 11 and a first inner mould 12. The first shoe body manufacturing portion 10A is located in the first inner mould 12, and the first inner mould 12 is disposed on a first inner surface 111 of the first outer mould 11. The first outer mould 11 and the first inner mould 12 are rectangular shaped, and the first outer mould 11 is larger than the first inner mould 12, so that the first template 10 has a stepped structure. The first snap fit 31 is disposed on the first inner surface 111 of the first outer mould 11, and located around the first inner mould 12. The first positioning member 41 is disposed on the first inner surface 111 of the first outer mould 11 and located around the first inner mould 12.

The second template 20 has a second outer mould 21 and a second inner mould 22. The second shoe body manufacturing portion 20A is located in the second inner mould 22, and the second inner mould 22 is disposed on a second inner surface 211 of the second outer mould 21. The second outer mould 21 and the second inner mould 22 are rectangular shaped, and the second outer mould 21 is larger than the second inner mould 22, so that the second template 20 is stepped shaped. The second snap fit 32 is disposed on the second inner surface 211 of the second outer mould 21 and located around the first inner mould 22, and the second positioning member 42 is disposed on the second inner surface 211 of the second outer mould 21 and located around the second inner mould 22.

In a preferred embodiment, the first outer mould 11 has a first engaging groove 13 formed in a surface opposite to the first inner surface 111, and further includes a first engaging block 311 and a first screw member 312. The first engaging block 311 is disposed in the first engaging groove 13, and the first screw member 312 is inserted through the first engaging block 311 and the first template 10 and screwed in the first snap fit 31 to fix the first snap fit 31 to the first template 10. The second outer mould 21 has a second engaging groove 23 formed in a surface opposite to the second inner surface 211, and further includes a second engaging block 321 and a second screw member 322. The second engaging block 321 is disposed in the second engaging groove 23. The second screw member 322 inserts through the second engaging block 321 and the second template 20, and is screwed in the second snap fit 32, so as to fix the second snap fit 32 to the second template 20. By such arrangements, the first engaging block 311 is disposed in the first engaging groove 13 and the second engaging block 321 is disposed in the second engaging groove 23, so as to disperse the force locked along the height direction H to prevent the first template 10 and the second template 20 from being damaged.

Figure 8:
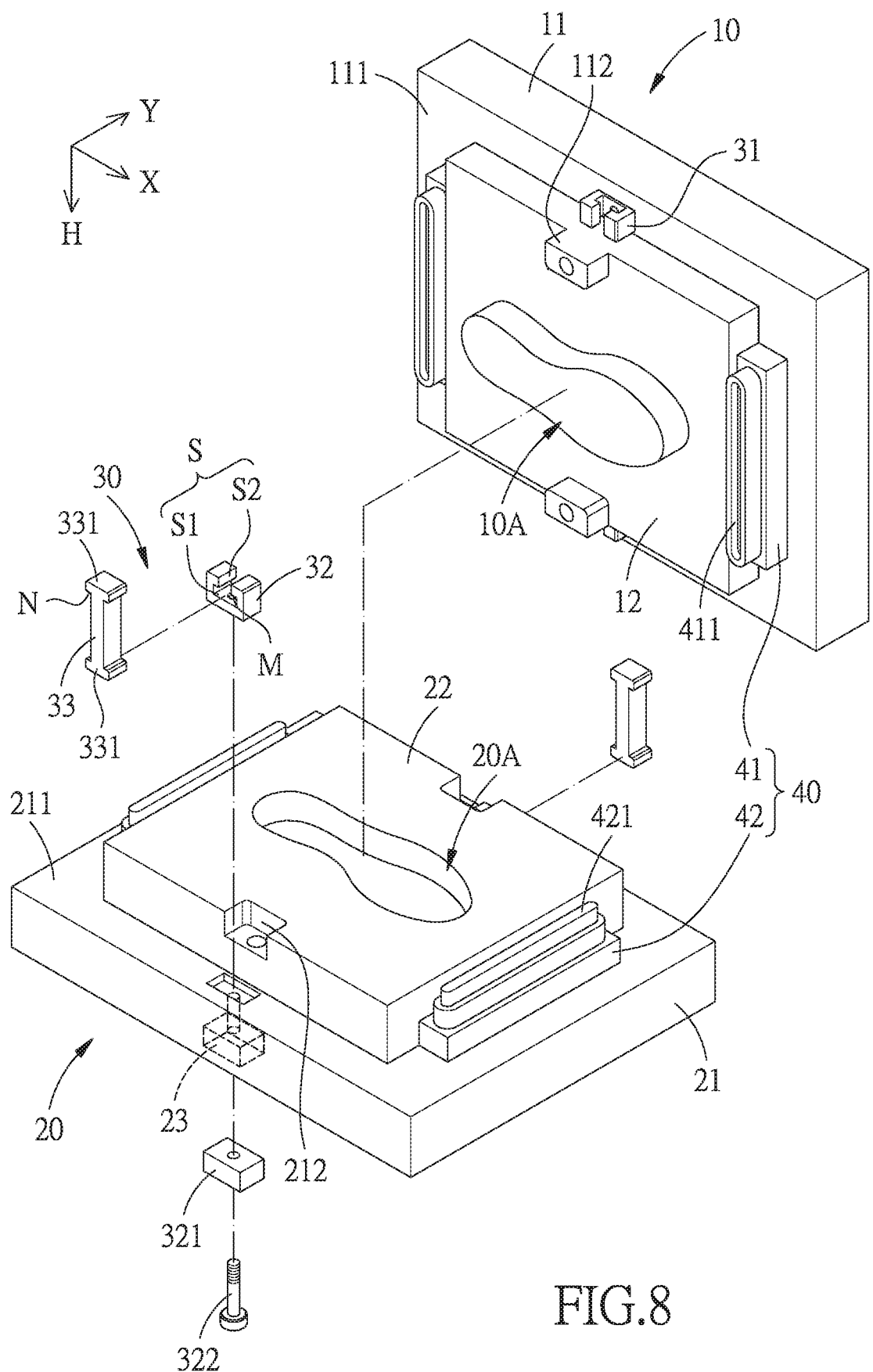
FIG. 8 is an exploded view of another embodiment of a microwave-transmitting mould structure according to the present invention.

In a preferred embodiment, as shown in FIG. 8, the first inner mould 12 further has a first locking portion 112, and the second inner mould 22 further has a second locking portion 212. The locking portion 112 is locked in the second locking portion 212 to make the fastening relationship between the first template 10 and the second template 20 more stable. Preferably, a bolt can be inserted through the first locking portion 112 and the second locking portion 212 so prevent the first template 10 and the second template 20 from being separated.

Figure 9:
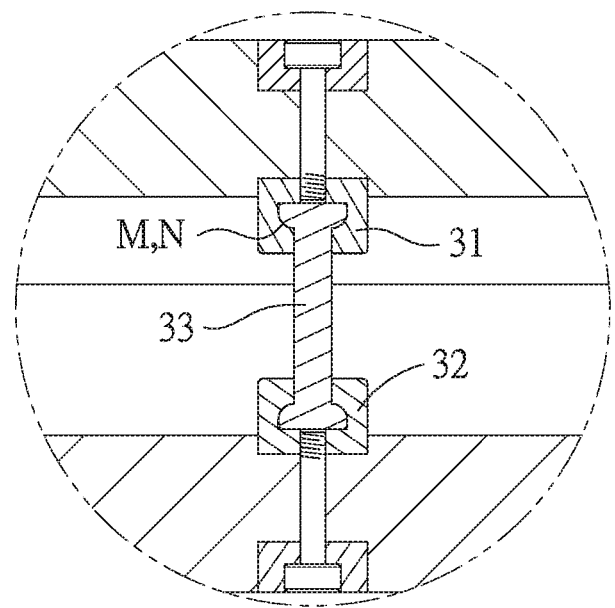
FIG. 9 is a cross-sectional view of the microwave-transmitting mould structure with different mould combining unit, according to the present invention.

In addition, in the preferred embodiment, as shown in FIG. 9, the abutting faces M and the corresponding faces N each are in the form of a curved surface.

Figure 10:
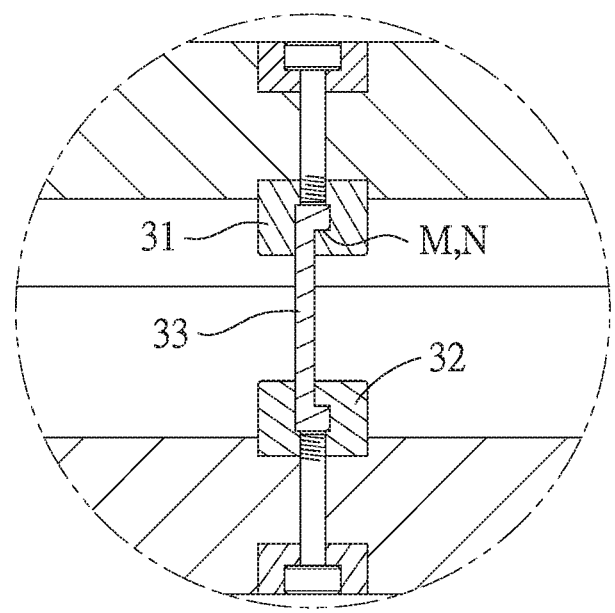
FIG. 10 is a cross-sectional view of the microwave-transmitting mould structure with different mould combining unit, according to the present invention.

In another embodiment, as shown in FIG. 10, the abutting face M and the corresponding face N are a single plane.

It can be learned from the above that the first template 10 and the second template 20 are respectively provided with the first snap fit 31 and the second snap fit 32, and then the engagement member 33 is engaged in the sliding grooves S of the first snap fit 31 and the second snap fit 32, so that, when the first template 10 and the second template 20 are subjected to the outward pressure, by the corresponding faces N of the engagement member 33 respectively abutting against the abutting faces M of the first snap fit 31 and the second snap fit 32, the first template 10 and the second template 20 are able to abut against each other without being separated due to an increase in pressure inside the mould.

In addition, the first template 10 and the second template 20 of the present invention are all made of a microwave-transmitting material, so that in the presence the microwave irradiation, the shoe parts can receive the energy of the microwave more evenly, so that the shoe parts can be heated more uniformly.

Figure 11:
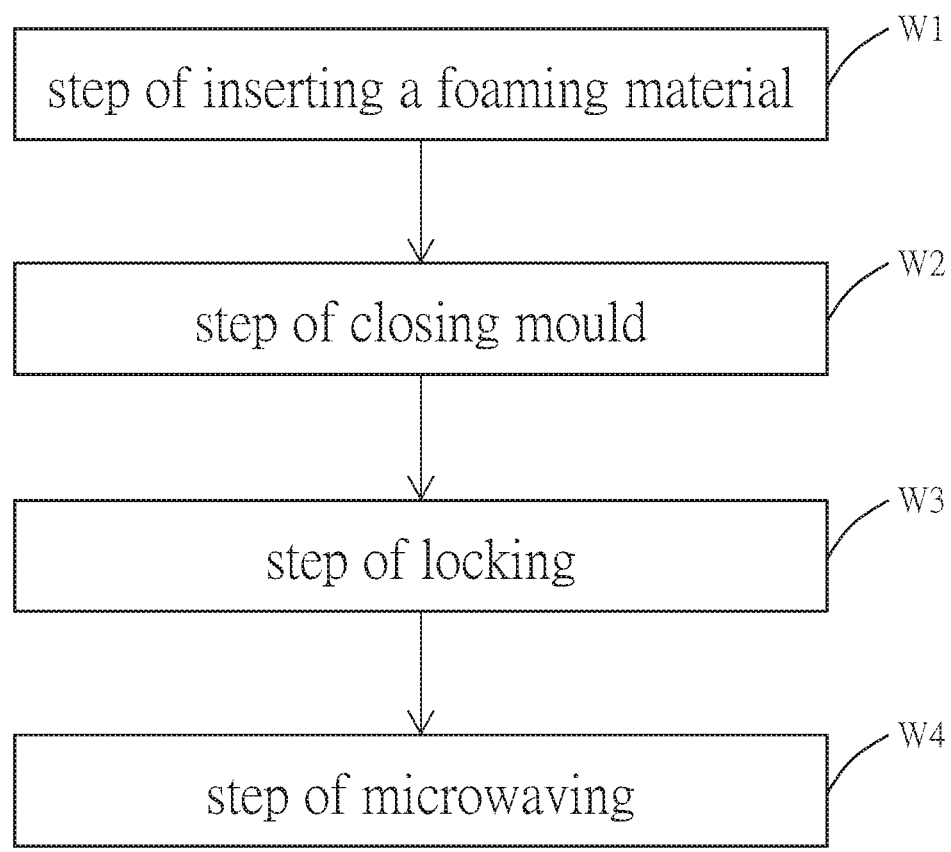
FIG. 11 is a flow chart showing a method for using a microwave-transmitting mould structure according to the present invention.

The invention further provides a method for using a microwave-transmitting mould structure, as shown in FIG. 11, comprising the following steps:

a step W1 of inserting a foaming material includes placing a foaming material into the first shoe body manufacturing portion 10A or the second shoe body manufacturing portion 20A;

a step W2 of closing mould includes closing the first template 10 and the second template 20, and applying a pressure to the first template 10 and the second template 20 to compress the foaming material inside the first template 10 and the second template 20, such that the first template 10 and the second template 20 are bonded more tightly;

a step W3 of locking includes placing the engagement member 33 between the first snap fit 31 and the second snap fit 32, and the corresponding faces N at two ends of the engagement member 33 are abutted against the abutting faces M of the first snap fit 31 and the second snap fit 32, respectively, so as to prevent the first template 10 and the second template 20 from being detached by expanding force of the foaming material; and a step W4 of microwaving includes placing the first template 10 and the second template 20 in a microwave device to subject to microwave irradiation, so that microwave energy directly penetrates the first template 10 and the second template 20 to the foaming material.

While we have shown and described various embodiments in accordance with the present invention, it is clear to those skilled in the art that further embodiments may be made without departing from the scope of the present invention.

What is claimed is:

1. A microwave-transmitting mould structure, comprising:

a first template made of a microwave-transmitting material;

a second template combined with the first template and made of a microwave-transmitting material;

a mould combining unit including a first snap fit, a second snap fit, and an engagement member, wherein the first snap fit is disposed on the first template, the second snap fit is disposed on the second template, the engagement member is disposed between the first snap fit and the second snap fit, the first snap fit and the second snap fit each have an abutting face, two ends of the engagement member each have a corresponding face, and the corresponding faces are abutted against the abutting faces;

wherein the first snap fit and the second snap fit respectively have a sliding groove, the abutting faces face the sliding grooves, the engagement member includes two engagement portions and a body portion, the two engagement portions are connected to two ends of the body portion, and each include one said corresponding face, the engagement portion at one end of the engagement member is engaged in the sliding groove of the first snap fit, and the engagement portion at another end of the engagement member is engaged in the sliding groove of the second snap fit;

two opposite ends of the sliding groove each have an open end in an open form, an extending direction between the two open ends is a horizontal direction, the sliding groove has a first groove portion and a second groove portion, a direction extending from the first groove portion to the second groove portion is a height direction which is perpendicular to the horizontal direction, a longitudinal direction is perpendicular to the horizontal direction and the height direction, the abutting face faces the first groove portion, the engagement portion at one end of the engagement member is engaged in the first groove portion of the first snap fit, the engagement portion at another end of the engagement member is engaged in the first groove portion of the second snap fit, a diameter of the first groove portion along the longitudinal direction is larger than that of the second groove portion along the longitudinal direction, a diameter of each of the engagement portions is equal to that of the first groove portion, and a diameter of the body portion is equal to that of the second groove portion.

2. The microwave-transmitting mould structure as claimed in claim 1 further comprising at least one positioning assembly having a first positioning member and a second positioning member, wherein the first positioning member is mounted on a surface of the first template facing the second template, the second positioning member is disposed on a surface of the second template facing the first template, and the first positioning member is connected to the second positioning member.

3. The microwave-transmitting mould structure as claimed in claim 2, wherein the first positioning member has at least one concave portion, the second positioning member has at least one convex portion, and the convex portion is inserted into the concave portion.

4. The microwave-transmitting mould structure as claimed in claim 2, wherein the first template has a first outer mould and a first inner mould, the first inner mould is disposed on a first inner surface of the first outer mould, the first outer mould is larger than the first inner mould, the first snap fit is disposed on the first inner surface of the first outer mould and located around the first inner mould, the first positioning member is disposed on the first inner surface of the first outer mould and located around the first inner mould;

the second template has a second outer mould and a second inner mould, the second inner mould is disposed on a second inner surface of the second outer mould, the second outer mould is larger than the second inner mould, the second snap fit is disposed on the second inner surface of the second outer mould and located around the first inner mould, and the second positioning member is disposed on the second inner surface of the second outer mould and located around the second inner mould.

5. The microwave-transmitting mould structure as claimed in claim 4, wherein the first outer mould has a first engaging groove formed in a surface opposite to the first snap fit, and further includes a first engaging block and a first screw member, the first engaging block is disposed in the first engaging groove, the first screw member is inserted through the first engaging block and the first template and screwed in the first snap fit, the second outer mould has a second engaging groove formed in a surface opposite to the second snap fit, and further includes a second engaging block and a second screw member, the second engaging block is disposed in the second engaging groove, and the second screw member inserts through the second engaging block and the second template, and is screwed in the second snap fit.

6. A method for using the microwave-transmitting mould structure as claimed in claim 1, comprising:
 a step of inserting a foaming material including placing the foaming material into a first shoe body manufacturing portion or a second shoe body manufacturing portion;
 a step of closing the mould including closing the first template and the second template, applying a pressure to the first template and the second template to compress the foaming material inside the first template and the second template;
 a step of locking including placing the engagement member between the first snap fit and the second snap fit, and the corresponding faces at two ends of the engagement member are abutted against the abutting faces of the first snap fit and the second snap fit, respectively; and
 a step of microwaving including placing the first template and the second template in a microwave device, so that microwave energy directly penetrates the first template and the second template to the foaming material.

\* \* \* \* \*